April 21, 1959     J. L. NOCK     2,883,216
END AND LIKE CONNECTIONS FOR GALVANISED
STRUCTURAL TUBES AND SIMILAR ELEMENTS
Filed Nov. 10, 1954
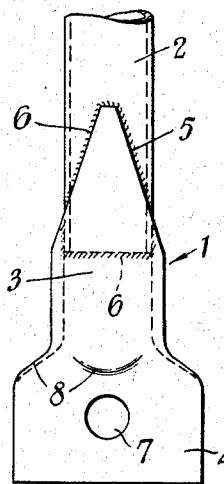 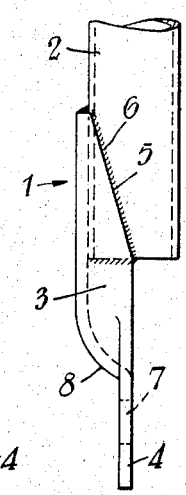 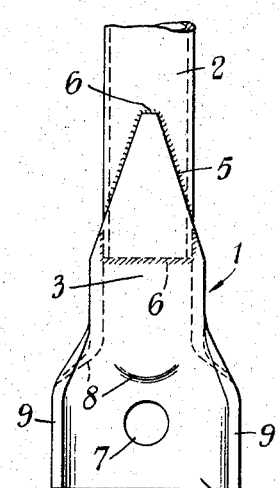
FIG. 1.     FIG. 2.     FIG. 3.
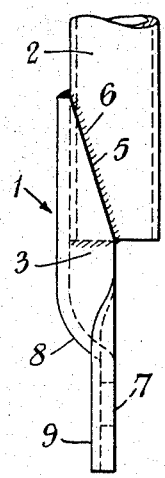 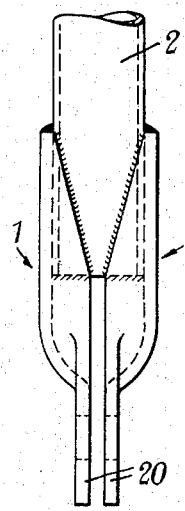
FIG. 4.     FIG. 5.
Inventor
James Lee Nock
By Sommers & Young
Attorneys

United States Patent Office 2,883,216
Patented Apr. 21, 1959

2,883,216

END AND LIKE CONNECTIONS FOR GALVANISED STRUCTURAL TUBES AND SIMILAR ELEMENTS

James L. Nock, Lugwardine, Hereford, England, assignor to Painter Brothers Limited, Hereford, England Application November 10, 1954, Serial No. 468,131

Claims priority, application Great Britain November 20, 1953

5 Claims. (Cl. 287—20.2)

This invention relates to end and like connections for galvanised structural tubes and similar elements.

It is known that the galvanising of closed tubes and the like is dangerous owing to the possibility of the pickling acid penetrating to the inside of the tubes.

Closed-ended tubes have a wide variety of applications for structural purposes and the ends have been flattened to enable the tubes to be connected to other tubes or structural elements.

An important object of the present invention is to provide an end connection for tubular and like structural members which is suitable for the galvanizing process and yet avoids the danger referred to above.

According to the invention, an end or like connection for a metal tube or similar element comprises a part of trough section and a terminal part extending from and integral with the trough-section part, the latter being constructed so that over a portion of its length remote from the terminal part it can fit on to an end of the tube or the like and be secured thereto, e.g. by welding where the two fit together, and the trough-section part being further constructed to allow the tube or the like to have an open adjacent end.

It will be realised that the end or like connection of the invention will allow free flow for molten galvanising metal inside the bore of open-ended tubes so that the danger referred to is advantageously avoided.

In order to enable the invention to be readily understood, reference is directed to the accompanying drawing in which:

Figure 1 is an elevation showing one construction of the end connection applied to a metal tube end, Figure 2 a side view of Figure 1, Figures 3 and 4 respectively views, similar to Figures 1 and 2, of another construction of the end connection, and Figure 5 a side view illustrating a construction embodying two of the end connections applied to a single tube end.

The end connection 1 of Figures 1 and 2, shown applied to an end of a round tube 2, is made of pressed mild steel and comprises a hollowed portion 3, somewhat of scoop shape, and a flat terminal part 4, more or less rectangular, which is integral with the hollowed portion and widens out therefrom (Figure 1). The hollowed portion 3, or tongue as it may be termed for convenience, constitutes the trough-section part of the connection. It fits from side to side closely around the tube end, say about half-way round, and is tapered at 5 to the end remote from the terminal part 4. It is intended to be welded to the tube around the edges of the taper portion 5 as shown at 6. The weld 6 is continuous and seals the contact faces between the end connection 1 and the tube 2 against penetration by pickling acid between them.

It will be realised that the shape of the connection shown in Figures 1 and 2 is such as may produce a desirably stiff form substantially right up to the hole 7 for the connecting bolts or other means by which the tube end 2 is to be connected to any adjacent member. The terminal part 4 of the connection is suitably perforated at 7 to receive connecting bolts or screws for this purpose. The taper part 5 of the tongue 3, as shown, may terminate at its wide end at about the extreme and open end of the tube 2, and between that point and the terminal part of the tongue is suitably of even width, see Figure 1. It curves at the root into the terminal part 4 as shown at 8, and, as will be seen, the open end of the tube is readily accessible for flow of galvanising metal into the bore of the tube. In order to meet the design requirements of nett area and bearing, the end connection 1 can be made in practically any reasonable thickness or width of material to suit the designer. The tongue 3 can be of any appropriate length to provide requisite length of fillet weld at 6.

In Figures 3 and 4, the construction is similar to that shown in Figures 1 and 2, excepting that the terminal portion 4 is formed with turned-back lip parts along its opposite side edges at 9. These lip parts are relatively shallow and they curve into the parallel edges of the tongue 3 as shown. Other parts seen in Figures 3 and 4 which are similar to those seen in Figures 1 and 2 are similarly numbered for convenience.

It is believed that the use of the end connections above described with reference to the drawing will be understood without further description. However, the invention is not limited to these particular constructions as modifications are possible without departing from the scope of the present improvements as will be understood. In Figure 5 of the drawing indication is given that two of the end connections, of construction substantially similar to that shown in Figures 1 and 2, can be applied at opposite sides of the end of a tube. Similar reference numerals are used in these several figures for convenience. As will be seen, the connections 1, 1 in Figure 5 are spaced apart so that the terminal parts provide a sort of bifurcated end 20 on the tube 2 which is useful for some purposes, while still leaving access to the adjacent open end of the tube for the purpose described. In some cases, a set of more than two end or like connections according to the invention may be applied around an end of a tube so long as access is left to open end of the tube for the purpose described.

The invention includes within its scope tubes or similar elements fitted with one or more of the end or like connections, and such combinations can readily be galvanised without danger from imprisoned pickling acid as will be understood.

Tubes or the like and end or like connections therefor as described are of advantageous use in the construction of openwork or lattice type masts, poles and towers.

I claim:

1. An end or like connection for a metal tube or similar hollow element having an open end, comprising a part of trough section constructed so that over a portion of its length at one end it can fit from side to side closely around part of the periphery of said element adjacent said open end and be secured externally thereto by welding at its opposite side edges and a substantially plane terminal connection part extending directly and integrally from the other end of said trough section part substantially in a plane containing parallel longitudinal edges of said other end of said trough section part so as to be opposite, and spaced away from, said open end of said element.

2. An end or like connection according to claim 1, wherein the terminal connection part comprises a plane portion formed with turned-back lip parts along its opposite edges.

3. An end or like connection according to claim 1 welded to the end of said element, the terminal connection part lying substantially in a plane of the axis of said element.

4. An end or like connection according to claim 1 and an identical end or like connection both welded to the end of said element, the terminal connection parts being adjacent to but spaced apart from each other and lying in planes parallel with each other and with the axis of said element and opposite the open end of said element.

5. An end or like connection for a metal tube or similar hollow element having an open end, comprising a part of trough section constructed so that over a portion of its length at one end it can fit from side to side closely around part of the periphery of said element adjacent said open end and be secured externally thereto by welding at its opposite side edges and a substantially plane terminal connection part extending directly and integrally from said trough section part remote from the said one end thereof, said terminal connection part comprising a plane portion formed with turned-back lip parts along its opposite edge and being situated so that said plane portion is opposite said open end of said element.

References Cited in the file of this patent

UNITED STATES PATENTS

| | | |
|---|---|---|
| 629,185 | Arnold | July 18, 1899 |
| 1,100,029 | Severns | June 16, 1914 |
| 1,524,295 | Erickson | Jan. 27, 1925 |
| 1,956,142 | Brohasek | Apr. 24, 1934 |
| 2,480,958 | Pietzsch | Sept. 6, 1949 |
| 2,650,294 | Berger | Aug. 25, 1953 |

FOREIGN PATENTS

| | | |
|---|---|---|
| 243,902 | Great Britain | Dec. 10, 1925 |